Sept. 16, 1969　　W. V. McCONNELL ET AL　　3,467,615
EPOXIDIZED HYDROCARBON MIXTURES
Filed June 29, 1967
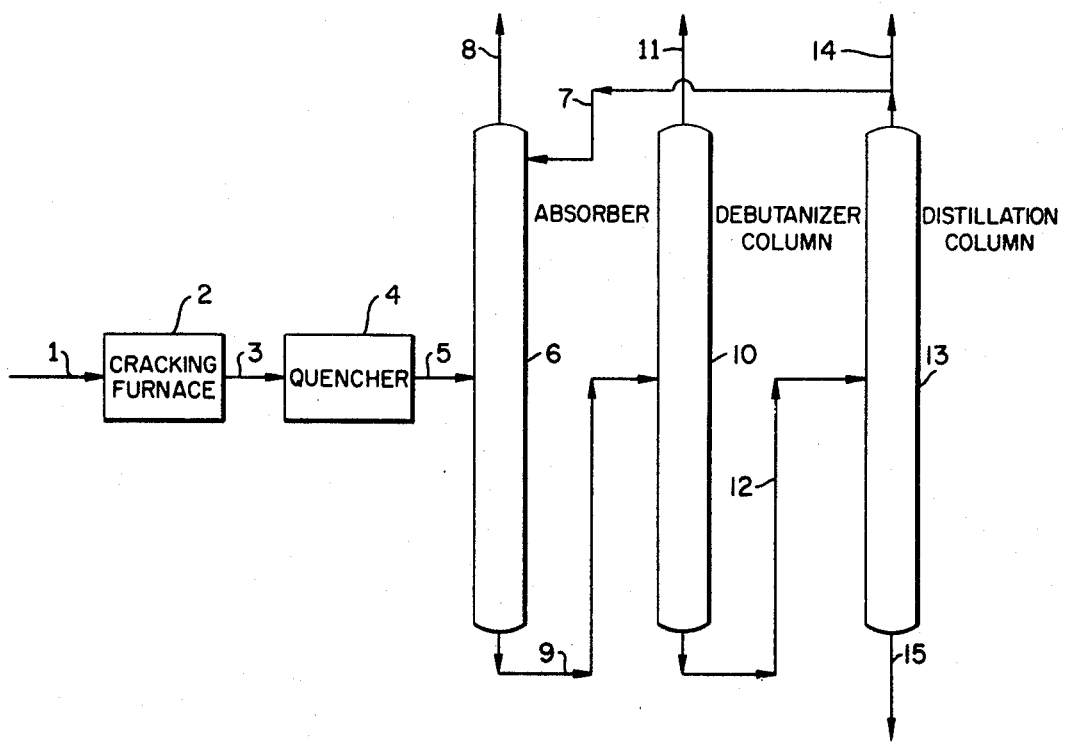
WAYNE V. McCONNELL
WILLIAM H. MOORE
INVENTORS.
BY R. Frank Smith
William J. French
ATTORNEYS United States Patent Office 3,467,615
Patented Sept. 16, 1969

3,467,615
EPOXIDIZED HYDROCARBON MIXTURES
Wayne Varon McConnell and William Howard Moore, Kingsport, Tenn., assignors to Eastman Kodak Company, Rochester, N.Y., a corporation of New Jersey
Continuation-in-part of application Ser. No. 337,760, Jan. 15, 1964. This application June 29, 1967, Ser. No. 659,260
Int. Cl. C08g 30/12; C08f 45/32, 45/58
U.S. Cl. 260—30.4   10 Claims

ABSTRACT OF THE DISCLOSURE

Novel epoxidized hydrocarbon mixtures (useful as stabilizers and as intermediates in the preparation of novel epoxy resins) are prepared by the liquid phase epoxidation of DAC–B, wherein said DAC–B is a liquid residual fraction of the debutanized residue from the pyrolysis of a natural gas stream predominantly comprising propane, said DAC–B having an iodine number of from about 195 to about 300 and containing from about 87 to about 91 percent carbon and from about 9 to about 13 percent hydrogen.

---

This application is a continuation-in-part of McConnell and Moore U.S. Ser. No. 337,760; filed Jan. 15, 1964, now abandoned.

The present invention relates to novel compositions of matter, their preparation, their use as stabilizers and plasticizer extenders, and their use in the preparation of novel epoxy resins.

These novel compositions are prepared from a complex hydrocarbon mixture which is the liquid residual fraction of the debutanized residue from the pyrolysis of a natural gas stream predominantly comprising propane.

This complex composition contains saturated, olefinically unsaturated, and aromatic hydrocarbons having an initial boiling point greater than about 60° C.

For the purposes of the present invention, this hydrocarbon composition will be referred to as "DAC–B," which is an abbreviation for a debutanized aromatic concentrate. The "B" is used to designate a particular fraction of the liquid residues as decribed herein by appropriate physical and chemical data.

Because the composition of DAC–B changes upon heating, it is not practical to conduct a complete ASTM distillation test. However, after hydrogenation, a typical DAC–B sample distills as follows:

ASTM DISTILLATION RANGE

|  | Temp., 0 C. |
|---|---|
| Initial | 68 |
| 5% | 92 |
| 10% | 101 |
| 20% | 119 |
| 30% | 130 |
| 40% | 143 |
| 50% | 158 |
| 60% | 182 |
| 70% | 203 |
| 80% | 235 |
| 90% | 283 |
| 93% | 316 |

Bottoms—4%. Loss—3%.

The composition of DAC–B depends somewhat on the feedstock used and the pyrolysis conditions. Other tests have determined that samples of DAC–B contain from about 87 percent to about 91 percent carbon and from about 9 percent to about 13 percent hydrogen and have an iodine member ranging from about 195 to about 350.

The viscosities of DAC–B samples are generally within the range of 0.5 to 5 centistokes at 100° F., but these values are not strict limits since this property is dependent on such factors as the temperature and pressure used for stripping the lower boiling hydrocarbon fractions.

Though it is not practical to fully analyze a DAC–B sample, we have determined that it contains at least 70 different compounds, some of the more important of which are toluene, mixed xylenes, styrene, 5-methylbicyclohept - 2 - ene, and 6 - methylene - 5 - methylbicyclohept-2-ene.

Styrene was the only aromatic compound identified having an unsaturated side chain. The other aromatic components were inert to expoxidation and, hence, were not altered during the reaction. The major species present were bicycloheptene derivatives. None of the DAC–B samples contained dicyclopentadiene.

As mentioned previously, the exact composition of DAC–B can be varied and depends on, among other things, the composition of the natural gas cracking feed; the temperature and pressure in the cracking furnace, the residence time in the cracking furnace, and the operating temperatures and pressure in distillation columns used in recovering the pyrolysis products.

The preparation of DAC–B is illustrated in FIGURE 1, which is a schematic flow diagram of a typical process for preparing DAC–B.

The natural gas cracking feed, generally consisting predominantly of propane or propane-ethane mixtures, is passed via line 1 into cracking furnace 2 where it is heated to a temperature of about 700° C. to about 800° C. at a pressure of about 10 to about 75 pounds per square inch gauge (hereafter referred to as p.s.i.g.) for a period of about one second. The effluent gas from the cracking furnace is removed via line 4, quenched in quencher 4, and passed via line 5 into absorber 6 where it flows upward countercurrent to an absorption oil introduced into absorber 6 via line 7. Components of the effluent gas having more than one carbon atoms are absorbed by the absorption oil. The enriched absorption oil then flows out of the absorber through line 9 and into debutanizer column 10 where isobutane and lower boiling components are removed overhead via line 11. The lean absorption oil, known as DAC or debutanized aromatic concentrate, flows out of the debutanizer column via line 12 and into distillation column 13 where it is separated into two fractions by distillation. The overhead fraction, known as DAC–A, is withdrawn via line 7 and removed via line 14 or recycled to absorber 6 as absorption oil. The higher boiling fraction, withdrawn as a residue via line 15, is DAC–B.

We have unexpectedly found that valuable compositions can be prepared by epoxidizing an unsaturated DAC–B composition. The resulting epoxidized DAC–B composition is useful as a secondary plasticizer-stabilizer for various synthetic resins. The epoxidized DAC–B composition can also be converted into a thermosetting epoxy resin which can be used as a casting composition or for a surface coating. The thermosetting epoxy resin can be prepared by heating a mixture comprising an epoxidized DAC–B composition and a dicarboxylic acid anhydride and then curing the resulting product at an elevated temperature.

A preferred embodiment of our invention is the novel epoxidized DAC-B composition prepared by reacting DAC-B with an organic peracid. Another preferred embodiment of our invention is the novel epoxidized DAC-B composition prepared by reacting oxidized DAC-B with an organic peracid. The oxidized DAC-B which can be used in accordance with our invention is prepared by oxidizing DAC-B with molecular oxygen by contacting the DAC-B with air at a rate of about 1 to about 5 cubic feet of air per hour per pound of DAC-B at a temperature of about 70° to about 150° C. The oxidation of DAC-B is disclosed in McConnell and Von Bramer Ser. No. 337,759, filed on Jan. 15, 1964, and now Patent No. 3,357,914. Another preferred embodiment of our invention is the novel epoxidized DAC-B composition prepared by reacting a higher boiling DAC-B fraction with an organic peracid.

The novel epoxidized DAC-B compositions of our invention contain from three to twelve percent oxirane oxygen.

The epoxidized DAC-B compositions of our invention can be prepared by cooling the DAC-B composition to about 10° C. to 40° C. and slowly adding an epoxidizing agent, such as peracetic acid, over a period of hours. The resulting mixture is stirred at 10° C. to 40° C. for several hours after the epoxidizing agent is added. The epoxidized DAC-B is then separated, neutralized, washed with water and dried. After drying, the low boilers are removed by vacuum stripping; and the residue is the novel epoxidized DAC-B.

A number of epoxidizing agents are useful for epoxidizing DAC-B compositions. Examples of these epoxidizing agents are a mixture of peracetic acid and acetic acid; a mixture of peracetic acid and water; and a mixture of cetic acid, hydrogen peroxide, water, and a soluble mineral acid. It is often desirable to employ sodium acetate as a buffer in the epoxidation media.

In a preferred embodiment of our invention we dissolve the DAC-B composition to be epoxidized in a solvent and stir the solution vigorously while adding sodium acetate. The mixture is then cooled to about 20° C. and held at that temperature while a 40 percent solution of peracetic acid in acetic acid is added dropwise over a two hour period. The resulting mixture is stirred for four hours at about 25° C. The solvent layer is then removed, neutralized, washed with water, and dried. The solvent and low boilers are removed by vacuum distillation to 60° C. at one mm. pressure, and the remaining epoxidized DAC-B product is held at that temperature and pressure for one hour.

In the prior art, the subjection of olefins to epoxidation results only in the conversion of the ethylene group to an epoxy group or, in some instances, to a diol when hydroxylation is encountered. In either of these reactions, the molecular weight of the product does not vary substantially from that of the starting olefin. The epoxidation of DAC-B, however, is accompanied by a very large increase in molecular weight (in addition to epoxidation of the olefinic groups) as shown by a considerable increase in viscosity. In addition, the oxirane oxygen content accounts for only about half of the total oxygen which is imparted to DAC-B during epoxidation. Therefore, one may readily discern from the above considerations that the epoxidation of DAC-B leads not only to epoxides or to products arising from the addition of water or ther solvent molecules to epoxy groups, but also to oxygenated co-products. These unexpected co-products impart properties which are beneficial to our novel compositions in their various uses as described in this invention. The increase in molecular weight is highly essential in the practice of this invention in that if epoxidation were the only reaction, our products would be too volatile for use as poly(vinyl chloride) stabilizers and intermediates for epoxy resins. For example, the distillation data reported for hydrogenated DAC-B shows that 50 percent of the composition distills below 150° C. If only epoxidation occurred, virtually this entire fraction would be lost from poly(vinyl chloride) compositions during blending and milling operations prior to fabrication into the desired end product. Similarly, excessive losses of such epoxides would be encounteretd in their incorporation with other materials (such as other epoxides( acid anhydrides, polyols, and amines) for the formation of epoxy resins via heat curing processes.

The following examples will serve to more fully illustrate the novel features and practices of this invention. However, it will be understood that they are but examples of specific embodiments of the invention and, therefore, not in limitation thereof.

The following examples illustrate the preparation of the epoxidized DAC-B compositions of our invention.

Example 1

A solution of 300 parts of DAC-B (iodine No. 284; viscosity, 2 cs. at 100° F.) in 600 parts of dichloromethane is charged into a 3-liter, 3-necked flask equipped with a mechanical stirrer, condenser, thermometer, and dropping funnel. The solution is stirred vigorously, and 30 parts of anhydrous sodium acetate is added. By means of an external ice water water bath, the temperature of the mixture is lowered to 20° C. and controlled at 20–25° C. while 600 parts of a 40 percent solution of peracetic acid (equivalent to 240 parts of peracid) is added dropwise during two hours. The reaction mixture is stirred at 25° C. for an additional four hours. The dichloromethane layer is separated and successively washed free of acid with five percent sodium bicarbonate solution, washed with water, and dried over magnesium sulfate. The solvent and low boilers are then stripped under reduced pressure. The remaining material is heated for one hours at 60° C. under a pressure of one mm. of mercury, after which 260 parts of epoxidized DAC-B having an oxirane content of 6.3 percent and iodine number of 33 is obtained. The viscosity of the product is 65 Cs. at 100° F. The epoxidized DAC-B analysis is as follows:

| | Percent |
|---|---|
| C | 77.1 |
| H | 9.2 |
| O (total) | 13.7 |

Example 2

A solution of 200 parts of DAC-B (iodine No. 284; viscosity, 2 cs. at 100° F.) in 595 parts of chloroform is charged into a 2-liter, 3-necked flask equipped as described in Example 1. To the vigorously stirred solution is added 16 parts of anhydrous sodium acetate. The temperature of the mixture is controlled at 25–30° C. while 320 parts of a 40 percent solution of peracetic acid in acetic acid (equivalent to 128 parts of peracid) is added during three and one-half hours. The reaction mixture is stirred at 25–30° C. for an additional three hours, then the organic layer is separated and washed with successive portions of water, five percent sodium bicarbonate solution, and water to remove the acetic acid. The chloroform and low boilers are stripped under reduced pressures, and the residue is heated at 80° C. under a pressure of two mm. of mercury for one hour. One hundred and fifty nine parts of epoxidized DAC-B having an oxirane oxygen content of 7.4 percent, an iodine number of 50, and a refractive index ($n_D^{20}$) of 1.5171 is recovered. The viscosity of the prodhct is 58 cs. at 100° F. The epoxidized DAC-B analysis is as follows:

| | Percent |
|---|---|
| C | 77.8 |
| H | 9.3 |
| O (total) | 12.9 |

Example 3

DAC–B is oxidized by passing air through the DAC–B for four hours at 110° C. at an air flow rate of 2.3 cubic feet per hour per pound of DAC–B. The resulting oxidized DAC–B has a viscosity of 16.3 centistokes at 100° F. and an iodine number of 186. A solution of 100 parts of oxidized DAC–B in 110 parts of chloroform is epoxidized with 190 parts of 32 percent peracetic acid according to the method of Example 1. Ninety eight parts of epoxidized oxidized DAC–B having an oxirane oxygen content of four percent and iodine number of 28 is recovered. The viscosity of the product is 300 cs. at 100° F.

The novel resins are resinous compositions of our invention are prepared from the novel epoxidized DAC–B compositions.

Thus, the epoxidized DAC–B compositions can be incorporated into synthetic resins, particularly poly(vinyl chloride) resins as secondary plasticizers and stabilizers. A preferred embodiment of our invention is a resinous composition comprising epoxidized DAC–B and a poly hibits unexpected stability to heat.

Example 4

The epoxidized DAC–B of Example 1 is blended into a poly(vinyl chloride) formulation in the following proportions: 100 parts of poly(vinyl chloride), 40 parts of dioctyl phthalate, 10 parts epoxidized DAC–B, and 2 parts of a barium-cadmium stabilizer. The plasticizers and the resin are dry-blended and milled together on a two-roll mill. The milled vinyl is pressed into a 70-mil sheet. The vinyl sheet containing epoxidized DAC–B is heated to 177° C. and retains its inherent yellow color for more than two hours. A vinyl composition of the same formula, but without the epoxidized DAC–B, turned black within 15 minutes when subjected to the same test.

Example 5

The epoxidized DAC–B of Example 2 was blended into a poly(vinyl chloride) formulation in the following proportions: 100 parts of poly(vinyl chloride), 40 parts of dioctyl phthalate, 10 parts of epoxidized DAC–B, and 2 parts of a barium-cadmium stabilizer. The plasticizers and the resin were dry-blended and milled together on a two-roll mill. The milled vinyl was pressed into a 70-mil sheet. The vinyl sheet containing epoxidized DAC–B was heated to 177° C. for two hours and retained its inherent yellow color. A vinyl composition of the same formula but without the epoxidized DAC–B turned black within 15 minutes when subjected to the same test.

Example 6

The epoxidized oxidized DAC–B of Example 3 was blended with a poly(vinyl chloride) formulation in the following proportions: 100 parts of poly(vinyl chloride), 40 parts of dioctyl phthalate, 10 parts epoxidized oxidized DAC–B, and 2 parts of a barium-cadmium stabilizer. The plasticizers and the resin were dry-blended and milled together on a two-roll mill. The milled vinyl was pressed into a 70-mil sheet. The vinyl sheet containing epoxidized oxidized DAC–B was heated to 177° C. for two hours and retained its inherent yellow color. A vinyl composition of the same formula but without the epoxidized DAC–B turned black within 15 minutes when subjected to the same test.

Novel epoxy resins may also be prepared by heating, at about 130° C. for about 15 hours, the epoxidized DAC–B with a dicarboxylic acid anhydride and then curing the resin at 175° C. for about four hours. The resulting resin is hard and infusible. In a preferred embodiment of our invention, we mix 400 parts of epoxidized DAC–B, 100 parts of maleic anhydride, and 1 part of 1,2,4-hexanetriol and heat the mixture at about 130° C. for about 15 hours. The resin is then cured by heating at 175° C. for about four hours.

The following examples illustrate the preparation of the hard infusible resin of our invention.

Example 7

Forty parts of epoxidized DAC–B, prepared according to the method of Example 1, is mixed with 10 parts of maleic anhydride and 0.1 part of 1,2,4-hexanetriol. The mixture is heated at 130° C. for 15 hours. The mixture is then cured to a hard infusible resin by heating at 175° C. for four hours.

Example 8

Forty parts of the epoxidized oxidized DAC–B described in Example 3 is mixed with 10 parts of maleic anhydride and 0.1 part of 1,2,4-hexanetriol and converted into a hard infusible resin by the method of Example 7.

Thus, our invention provides novel epoxidized DAC–B compositions which are useful as plasticizers and in preparing novel resinous compositions of unexpected value.

Although our invention has been described in considerable detail with particular reference to certain preferred embodiments thereof, it will be understood that variations and modifications can be effected within the scope of the invention as described hereinbefore, and as defined in the appended claims.

We claim:

1. An epoxidized organic composition containing from about 6 to about 24 percent oxygen, of which from 3 to about 7.4 percent is oxirane oxygen, and prepared by the liquid phase epoxidation of DAC–B at a temperature of from aboue 10° C. to about 40° C., wherein said DAC–B is a liquid residual fraction of the debutanized residue from the pyrolysis of a natural gas stream predominantly comprising propane, said DAC–B having an initial boiling point greater than about 60° C., an iodine number of from about 195 to about 300, and containing from about 87 to 91 percent carbon and from about 9 to about 13 percent hydrogen.

2. A plasticized vinyl resin comprising poly(vinyl chloride), a primary plasticizer, and an epoxidized organic composition as defined by claim 1.

3. A plasticized vinyl resin as defined by claim 2 wherein said primary plasticizer is dioctyl phthalate.

4. An infusible resin prepared by heating at an elevated temperature a dicarboxylic acid anhydride and an epoxidized organic composition as defined by claim 1 and then curing said infusible resin by heating at a higher elevated temperature.

5. An infusible resin as defined by claim 4 wherein said dicarboxylic acid anhydride is selected from the group consisting of maleic anhydride and phthalic anhydride.

6. An epoxidized organic composition as defined by claim 1 wherein said DAC–B, prior to epoxidation, is first oxidized with air by contacting said DAC–B with air at a rate of about one to about five cubic feet of air per hour per pound of DAC–B at a temperature of about 70° C. to about 150° C.

7. A plasticized vinyl resin comprising poly(vinyl chloride), a primary plasticizer, and an epoxidized organic composition as defined by claim 6.

8. A plasticized vinyl resin as defined by claim 7 wherein said primary plasticizer is dioctyl phthalate.

9. An infusible resin prepared by heating at an elevated temperature a dicarboxylic acid anhydride and an epoxidized organic composition as defined by claim 6 and then curing said infusible resin by heating at a higher elevated temperature.

10. An infusible resin as defined by claim 9 wherein said dicarboxylic acid anhydride is selected from the group consisting of maleic anhydride and phthalic anhydride.

(References on following page)

References Cited

UNITED STATES PATENTS

| | | | |
|---|---|---|---|
| 3,357,914 | 12/1967 | McConnell et al. | 260—37 |
| 2,938,875 | 5/1960 | Matin et al. | 260—2 |
| 2,833,747 | 5/1958 | Greenspan et al. | 260—2 |

OTHER REFERENCES

Becco Research and Devl. Corp., Bull. # 69, Becco Chemical Div., Food Mach. & Chem. Co., Buffalo, N.Y., pages 1–4, 27, 28, 36, 39–41 relied upon.

MORRIS LIEBMAN, Primary Examiner

L. T. JACOBS, Assistant Examiner

U.S. Cl. X.R.

260—2, 31.8, 78.4, 348